Jan. 25, 1966   V. J. RIGOLINI   3,230,852
CAMERA SHUTTER

Filed Feb. 15, 1963   3 Sheets-Sheet 1

Jan. 25, 1966 V. J. RIGOLINI 3,230,852
CAMERA SHUTTER
Filed Feb. 15, 1963 3 Sheets-Sheet 2

Jan. 25, 1966    V. J. RIGOLINI    3,230,852
CAMERA SHUTTER
Filed Feb. 15, 1963    3 Sheets-Sheet 3
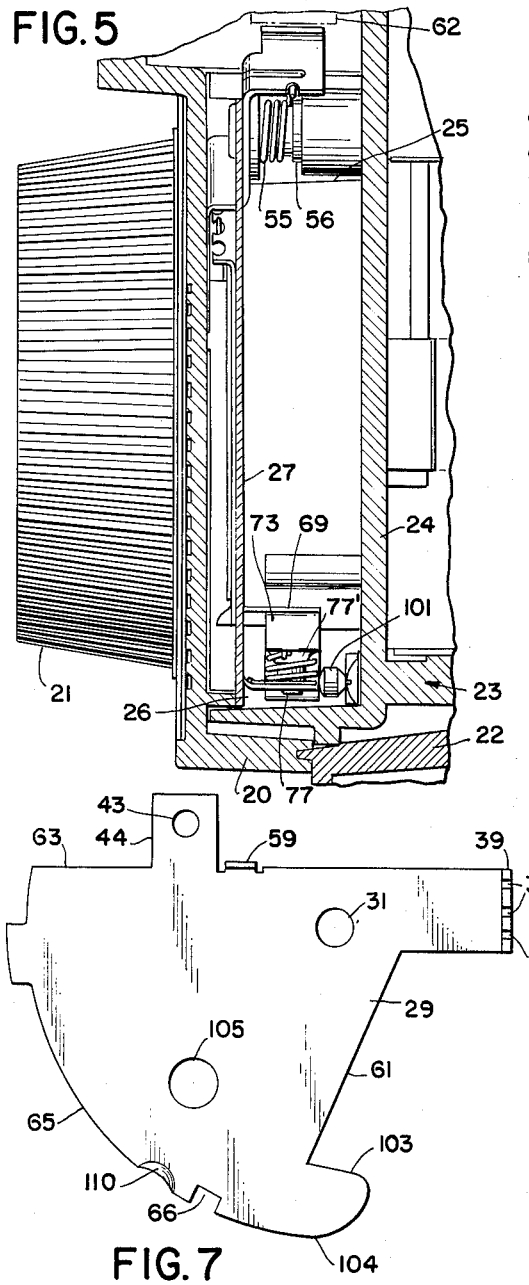
FIG. 5
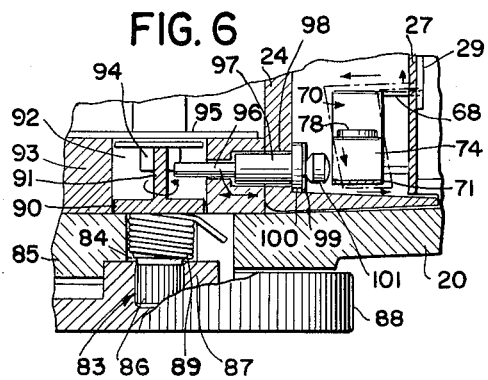
FIG. 6
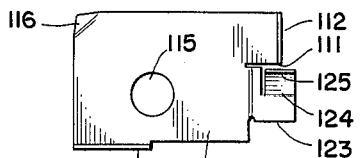
FIG. 9
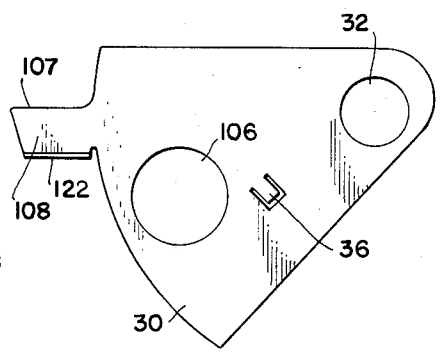
FIG. 10
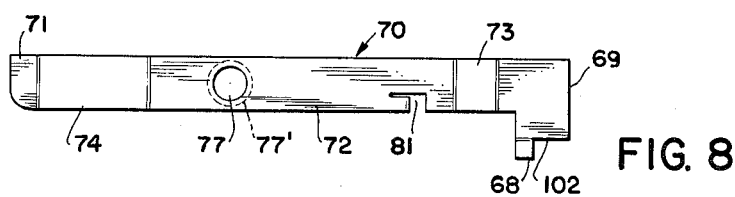
FIG. 7
FIG. 8

United States Patent Office 3,230,852
Patented Jan. 25, 1966

3,230,852
CAMERA SHUTTER
Venerio J. Rigolini, Brooklyn, N.Y., assignor to Whitehouse Products, Inc., Brooklyn, N.Y., a corporation of New York
Filed Feb. 15, 1963, Ser. No. 259,483
8 Claims. (Cl. 95—60)

The present invention relates to cameras and more particularly to camera shutter mechanisms.

In recent years it has become common to equip cameras with double exposure prevention mechanisms which prevent a second shutter operation after an exposure has been made and until the film has been wound so as to present an unexposed area to the light-admitting lens system. However, problems have been encountered in securing double exposure prevention mechanisms which are reliable in operation and which are sufficiently simple from a construction and assembly standpoint as to render them suitable for use in inexpensive, mass-produced cameras.

A principal object of the invention has been to provide a novel and improved double exposure prevention mechanism.

More particularly, it has been an object of the invention to provide a novel and improved double exposure prevention mechanism which is reliable in operation and which is simple in construction and easy to assemble so as to be especially adapted for use in inexpensive mass-produced cameras.

Still a further object of the invention has been the provision of such a mechanism which does not require close manufacturing tolerance.

Another problem which has been encountered, particularly when cameras are exposed to unfavorable climatic conditions, is a tendency for the oil or lubricant film on the contacting surfaces of the exposure and aperture blades to become gummy and to cause theses blades to stick together during that part of the exposure blade travel which is spring powered. In accordance with a further aspect of the invention, it has been a still further object of the invention to provide a shutter mechanism so constructed that even should the lubricant film become gummy, the shutter blades will separate properly to give the required operation for a proper exposure.

Other and further objects, features and advantages of the invention will appear more fully from the following description taken in connection with the appended drawings, in which:

FIG. 5 is a cross sectional view taken along the line 5—5 of FIG. 1;

FIG. 6 is an enlarged cross sectional view taken along the line 6—6 of FIG. 5;

FIG. 7 is a front elevational view of the aperture blade of FIG. 1;

FIG. 8 is a top plan view of the shutter locking lever of FIG. 1;

FIG. 9 is a front elevational view of the timing plate of FIG. 1, and

FIG. 10 is a front elevational view of the exposure blade of FIG. 1.

Figure 1:
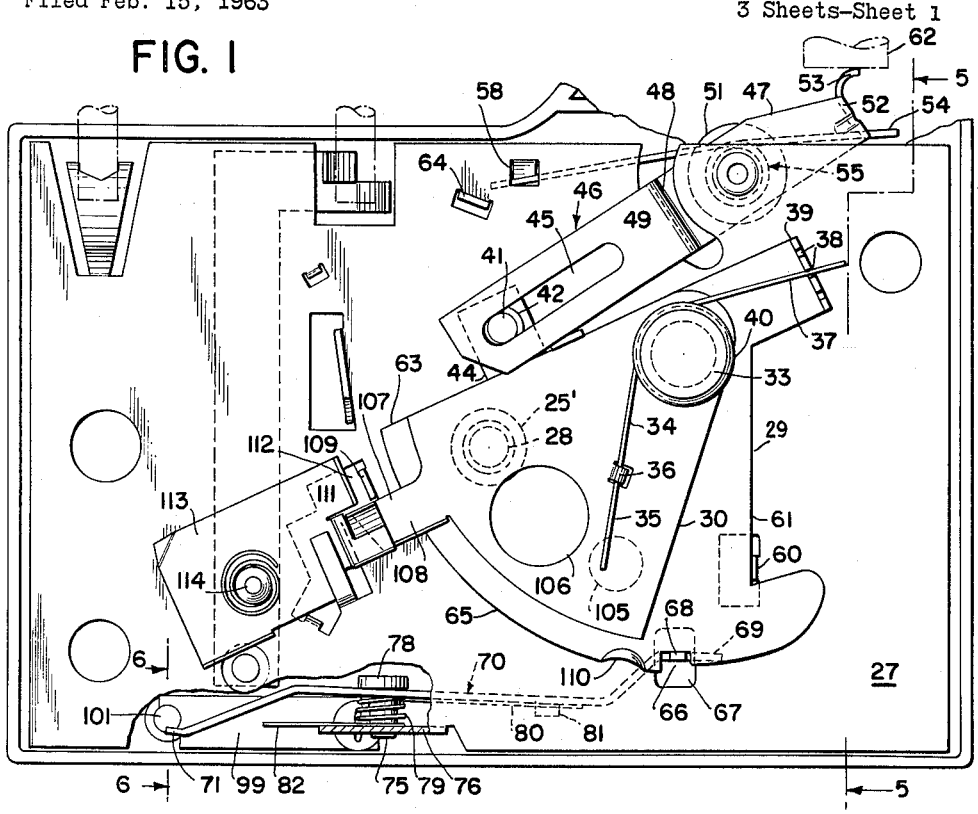
FIG. 1 is a front elevational view of a camera embodying the invention but with the front cover and lens housing removed, the shutter being in a position of rest after the making of an exposure but before the film winding knob has been operated to position an unexposed length of film behind the camera cone.

Referring now to the drawings and particularly FIG. 5, the camera comprises a front cover 20 which carries at the front thereof a lens housing 21 and which engages at the rear thereof the camera rear cover 22. A camera body 23 is carried within the front and rear covers. The covers and camera body may conveniently be made of molded plastic or other suitable material.

A transverse wall 24 located inwardly of the front end of body 23 is provided with a forwardly projecting hollow box 25 forming the front end of the camera cone and having a tapered exposure opening 25' in the front end thereof. That portion of body 23 forward of wall 24 forms a front compartment 26 which is closed adjacent the front of body 23 by a shutter mechanism supporting plate 27 which is carried on lugs projecting rearwardly from front cover 20. Plate 27 is provided with an exposure opening 28 aligned with opening 25'. The rear surface of plate 27 rests against the front end of box 25.

The shutter mechanism comprises an aperture blade 29 and an exposure blade 30 having mounting holes 31 and 32, respectively. The blades 29 and 30 are pivotally mounted on the front surface of plate 27 by means of a fixed stud 33 which is fixedly attached to the plate 27. The stud 33 has a region of narrow diameter which is accommodated by hole 31 and a region of wider diameter which is accommodated by hole 32.

The aperture blade 29 underlies the exposure blade 30. The blade 30 is urged to rotate in a clockwise direction (FIG. 1) relative to blade 29 by a coil spring 34 which is wound around stud 33 and which has one end leg 35 held by a lug 36 struck from the front surface of blade 30. The other end leg 37 of spring 34 rests in one of the notches 38 provided in a forwardly extending flange 39 provided at one end of blade 29. The tension of spring 34 may be adjusted by moving leg 37 to one or another of the notches 38. The spring 34 is retained on stud 33 by a flanged head 40 provided at the forward end of stud 33.

For convenience, the "forward" or "outer" direction will be deemed to be the direction toward the lens housing, i.e., toward the left in FIG. 5 while the "rear" or "inner" direction will be opposite. The "clockwise" and "counterclockwise" directions of rotation will be deemed to have reference to FIGS. 1–4. The term "upper" and "lower" and "right" and "left" likewise will have reference to FIGS. 1–4.

A stud 41 having a radial flange 42 is carried in a hole 43 provided in a projection 44 at the upper edge of blade 29. The stud 41 is accommodated in an elongated slot 45 provided adjacent one end of a shutter actuating lever 46. The inner surface of lever 46 adjacent slot 45 rests on flange 42, thus holding the corresponding part of lever 46 above blade 30. The opposite end 47 of lever 46 is offset rearwardly by a dog leg 48 acting in an elongated, arcuate open-ended slot 49 in plate 27.

Lever 46 is pivotally attached to the inner surface of plate 27 by means of a fixed stud 50 projecting inwardly from plate 27 and acting in a hole in end 47 of lever 46. Stud 50 has a radial flange 51 which prevents motion of lever 46 in a plane normal to the surface of plate 27. At the free end of end 47 there is provided an inwardly extending projection 52 having at the upper end thereof an arcuate surface 53. Projection 52 is provided with a notch opposite surface 53, which notch engages a leg 54 of a wire spring 55. The body of spring 55 is coiled about stud 50, being retained thereon by a flanged head 56. The other end 57 of spring 55 is retained by a lug 58 struck from the inner surface of plate 27. The action of spring 55 is to urge lever 46 to rotate in a counterclockwise direction about stud 50. Through the interconnection afforded by stud 41 and slot 45, counterclockwise rotation of lever 46 will produce a corresponding rotation of blade 29. By reason of a lug 59 projecting forwardly from the upper edge of blade 29 and arranged to contact the upper edge of blade 30, counterclockwise rotation of blade 29 will produce counterclockwise rotation of blade 30. The spring 55 is stronger than the spring 34 so that, when the parts are free to move, spring 55 will force lever 46 and shutter blades 29 and 30 into the positions thereof shown in FIG. 1. Counterclockwise motion of blade 29 is stopped by a lug 60 which extends forwardly from the outer surface of plate 27 in the path of an edge 61 of blade 29. Spring 34 stops counterclockwise rotation of blade 30 as soon as edge 61 of blade 29 contacts lug 60.

A plunger 62 which extends beyond the top wall of front cover 20 through a hole (not shown) is manually depressed, as by the user's finger, to make an exposure. The bottom surface of plunger 62 contacts arcuate surface 53 of lever 46 so that as the plunger 62 is depressed the lever 46 is rotated in a clockwise direction against the action of spring 55.

Clockwise rotation of lever 46 in turn produces a corresponding clockwise rotation of aperture blade 29. Plunger 62 is moved downwardly until clockwise rotation of lever 46 and blade 29 is stopped by contact of an upper edge 63 of blade 29 with a lug 64 which projects forwardly from the outer surface of plate 27. When plunger 62 is released, it is returned to its FIG. 1 position by counterclockwise rotation of lever 46 under action of spring 55. Blade 29 is likewise returned to its FIG. 1 position by action of spring 55.

An arcuate lower edge 65 of aperture blade 29 is provided with an open ended notch or slot 66 which is aligned with a rectangular slot 67 in plate 27 when blade 29 is in the FIG. 1 position thereof. The slots 66 and 67 accommodate a forwardly projecting finger 68 provided adjacent an end portion 69 of a pivoted arm 70.

Arm 70 comprises end portion 69, an end portion 71 at the other end thereof, a central portion 72 and inclined dog leg portions 73 and 74 joining portions 69 and 72 and portions 71 and 72, respectively. As shown in FIG. 1, the portions 69, 71 and 72 are disposed in approximately horizontal planes.

The lever 70 is pivotally mounted at the rear of plate 27 by means of a stud 75 which is fixedly mounted in a flange 76 which extends rearwardly from plate 27 adjacent the bottom edge thereof. The stud 75 acts in a hole 77 provided in central portion 72 of lever 70. A flanged head 78 on stud 75 acts to retain lever 70 on stud 75. A wire spring 79 is coiled about stud 75 beneath lever 70. The upper end of the coiled portion of spring 79 is wrapped around a downwardly extending flange 77' which surrounds hole 77. One free end 80 of spring 79 extends along the under surface of central portion 72 and abuts against a lug 81 which extends downwardly from the forward edge of central portion 72. The other free end 82 of spring 79 extends in the other direction along the rear surface of plate 27 and abuts against plate 27.

Lever 70 is free to pivot about stud 75 in a horizontal plane and in a vertical plane. Spring 79 acts against lever 70 to pivot the lever 70 in a clockwise direction in both planes. That is to say, in FIG. 1 the spring 79 urges lever 70 to move so that finger 68 will move forwardly into slots 66 and 67 and also upwardly.

When finger 68 extends into slot 66, as shown in FIG. 1, presence of finger 68 in slot 66 locks aperture blade 29 against movement and hence also prevents lever 46 from pivoting and plunger 62 from being depressed. Thus in FIG. 1 position of the parts, the shutter mechanism is locked and cannot be actuated.

Referring particularly to FIG. 6, it will be observed that a film winding shaft 83 is mounted in a hole 84 in a rearwardly extending flange 85 of front cover 20. Shaft 83 has a knurled head 86 which is received and retained in a hole provided in a hub 87 of a film winding knob 88. A spring 89 surrounds shaft 83 in hole 84 and is arranged to prevent reverse rotation of the film winding shaft.

The upper end of film winding shaft 83 is formed as a circular flange 90 from which projects a flat finger 91 the width of which is the same as the diameter of flange 90. Flange 90 and finger 91 act in a circular hole 92 in a rearwardly extending flange 93 of body 23. Finger 91 is adapted to be engaged by the usual bifurcated end 94 of a film spool 95. Upon manual rotation of the film winding knob 88, shaft 83 is turned in the direction shown by the arrow in FIG. 6, causing spool 95 to be rotated in the film winding direction so that film from another spool (not shown) will be wound onto spool 95 in the usual manner.

A rearwardly extending pin 96 at one end of a stud 97 extends through a rearwardly extending hole in flange 93 and into hole 92. The stud 97 is slidably mounted in a hole 98 in wall 24. A leaf spring 99 is affixed to the outer surface of wall 24 and acts against a radially extending flange 100 on stud 97 to urge stud 97 to move axially rearwardly, the stud 97 and pin 96 being shown in their rear positions in FIG. 6. The forward end of stud 97 is formed as a head 101.

Head 101 is positioned so as to be directly adjacent the rear edge of end portion 71 of lever 70 when the latter is in the position thereof shown in FIG. 1 and shown in solid lines in FIG. 6. As the film winding knob 88 is rotated, finger 91 is rotated and a flat side surface thereof contacts pin 96, forcing pin 96 and stud 97 to slide axially forwardly against the action of spring 99. Since finger 91 extends for the full diameter of flange 90, the pin contacting and sliding action will occur twice during each revolution of winding knob 88.

Figure 2:
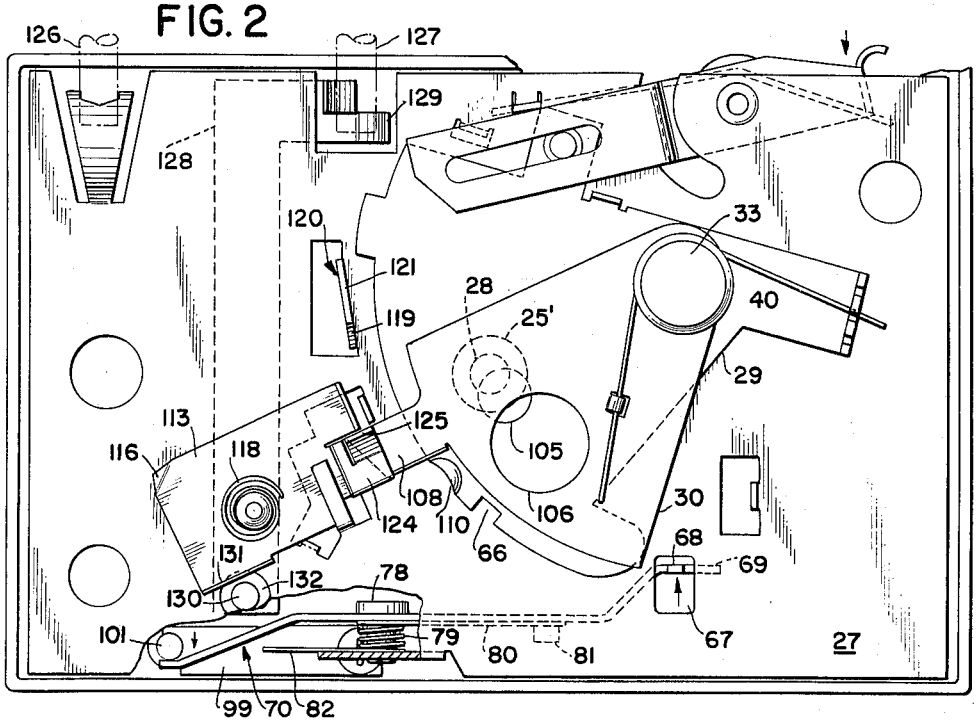
FIG. 2 is a front elevational view similar to FIG. 1 but showing the shutter mechanism and other parts at an intermediate position just before an exposure is made.

When stud 97 moves axially forwardly, head 101 contacts end 71 of lever 70 and moves end 71 forwardly, thus pivoting lever 70 against the action of spring 79 and in a counterclockwise direction about stud 75. As soon as the pivoting motion of lever 70 about stud 75 causes finger 68 to be withdrawn completely from notch 66 in blade 29, the further action of spring 79 causes lever 70 to pivot in a counterclockwise direction about the axis of stud 75 so that finger 68 moves upwardly and end 71 moves downwardly. These pivoted positions of finger 68 and end 71 are shown in FIG. 2 and are shown in dotted lines in FIG. 6. The finger 68, when free of notch 66, rests against the inner surface of blade 29 above notch 66. Upward motion of finger 68 is limited by adjustment of spring 79 and by contact of finger 68 with the upper edge of slot 67 in plate 27.

After finger 68 has been withdrawn from notch 66, as described, plunger 62 may be depressed to make an exposure, as described previously.

When finger 91 loses contact with pin 96, which occurs as film winding knob 88 is rotated further, spring 99 returns pin 96, stud 97 and head 101 to the rearward positions, as shown in FIG. 6. However, even though this causes head 101 to be out of contact with lever 70, the latter will remain in the FIG. 2 position thereof because of the action of spring 79 and because of contact of finger 68 with the inner surface of shutter blade 29. Still further rotation of film winding knob 88 will again result in forward motion of pin 96, stud 97 and head 101, but such forward motion will not change the position of lever 70.

As shutter 29 is rotated in a clockwise direction, which occurs when plunger 62 is depressed, a position is reached in which the forward end of finger 68 will lose contact with the inner surface of blade 29. When this contact is lost, lever 70 is free to pivot still further in a clockwise direction about stud 75, causing finger 68 to move further forward into slot 67. This further pivoting action ceases when a shoulder 102 of lever 70 contacts the inner surface of plate 27.

When shoulder 102 contacts plate 27, finger 68 will extend forwardly of the front surface of plate 27 and in the return path of an arcuate tail 103. Thus when blade 29 is returned toward its FIG. 1 position after the making of an exposure, the upper surface of finger 68 is contacted by arcuate edge 104 of tail 103. The edge 104 acts as a cam while finger 68 acts as a cam follower, causing finger 68 to move downwardly in slot 67 as blade 29 approaches its FIG. 1 position. Downward motion of finger 68 of course results in a corresponding pivoting of lever 70 in a clockwise direction about the axis of stud 75.

A few degrees prior to blade 29 reaching its FIG. 1 position, notch 66 will become aligned with finger 68 so that spring 79 will be able to pivot lever 70 in a counterclockwise direction about the axis of stud 75, bringing finger 68 into slot 66 and thus locking blade 29 and the other shutter mechanism parts against further motion until operation of the film winding knob 88 again causes finger 68 to be withdrawn from notch 66, as described.

Figure 3:
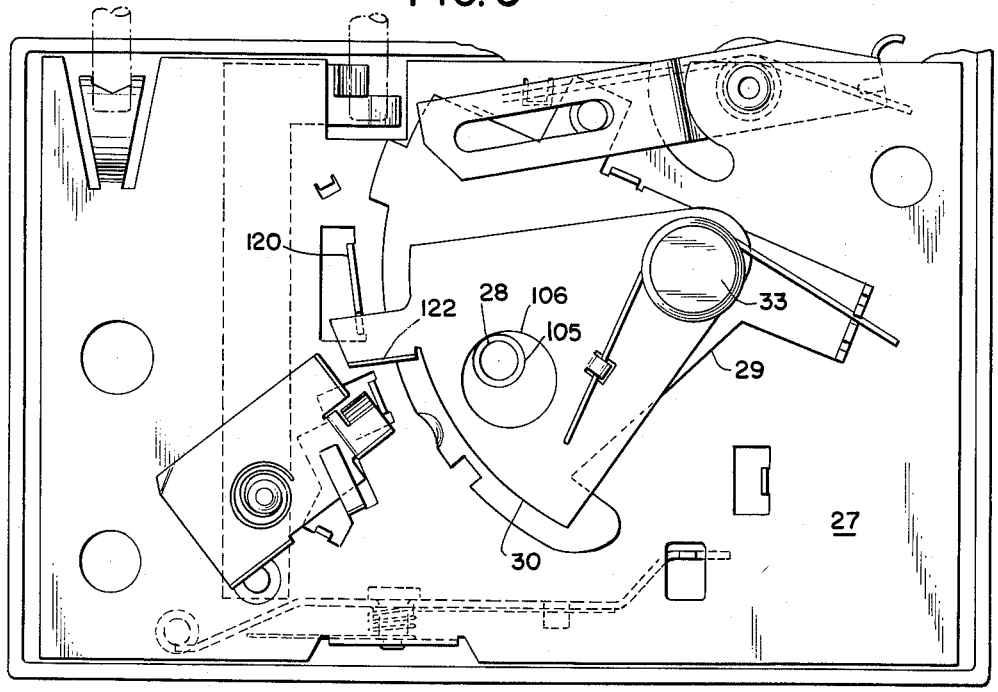
FIG. 3 is a front elevational view similar to FIG. 1 but showing the shutter mechanism and other parts in the position occupied at the time of making an exposure.
Figure 4:
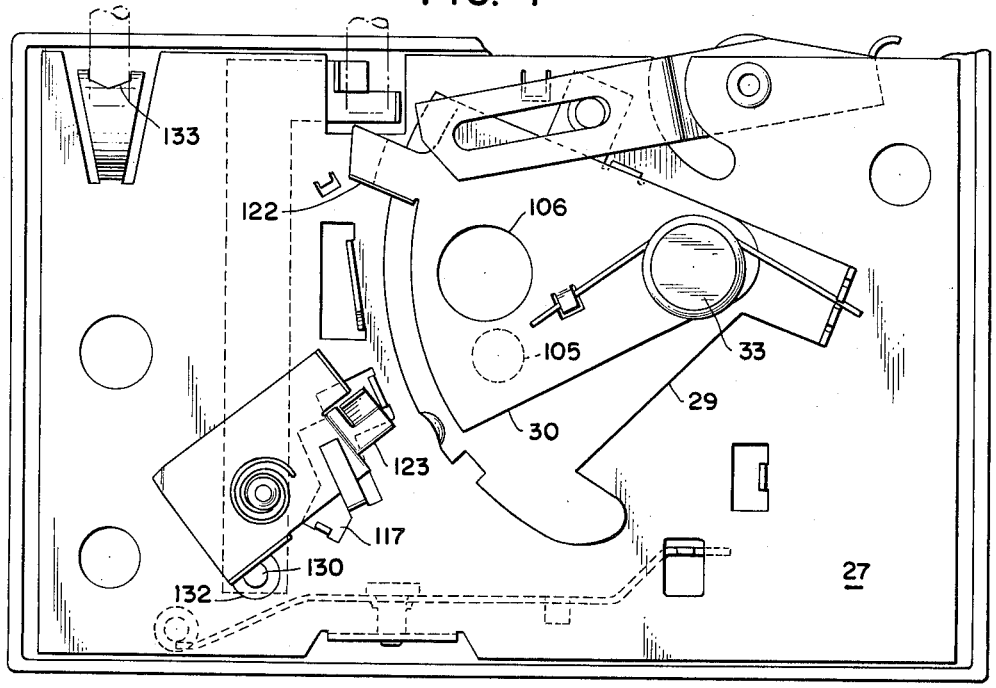
FIG. 4 is a front elevational view similar to FIG. 1 but showing the shutter mechanism and other parts in the position occupied at the completion of the exposure making part of the cycle just prior to return to the position of FIG. 1.

In making an exposure, plunger 62 is depressed, causing aperture blade 29 to rotate in a clockwise direction about stud 33 until edge 63 of blade 29 contacts stop lug 64. In this full clockwise position of blade 29 (shown in FIGS. 3 and 4), an aperture 105 in blade 29 is aligned with openings 25' and 28. However an exposure cannot be made until exposure blade 30 moves to a position in which an aperture 106 thereof is aligned with apertures 25', 28 and 105. This position of the shutter blades is shown in FIG. 3.

In the position of the exposure blade 30 shown in FIG. 1, a shoulder 107 of an extending finger 108 is located adjacent a vertical shoulder of a triangular forwardly extending lug 109 which is struck from the plate 27. Contact between shoulder 107 and lug 109 as shown in FIG. 2, occurs after a few degrees of clockwise rotation of blade 29 and prevents spring 34 from rotating blade 30 even when blade 29 has been rotated sufficiently to free blade 30 from lug 59.

Edge 65 of blade 29 is provided with a forwardly extending arcuate dimple or hump 110 which rides under finger 108 as blade 29 continues moving in a clockwise direction. Dimple 110 raises finger 108, causing blade 29 to pivot in a plane normal to the axis of stud 33. The dimple 110 is high enough to raise finger 108 forwardly beyond the forward edge of the adjacent vertical shoulder of lug 109, thus permitting finger 108 to pass over the lug 109 under urging of spring 34. However, even when finger 108 is clear of lug 109, blade 30 is not free to rotate because the shoulder 107 of finger 108 contacts a vertical shoulder 111 of a triangular lug 112 which projects forwardly from one edge of a plate 113.

Plate 113 is pivotally mounted on the front surface of plate 27 by a stud 114 which extends through a hole 115 in plate 113. A corner 116 of plate 113 is bent toward plate 27, causing the opposite corner of plate 113 to be cast partially into a stepped slot 117 in plate 27.

A coil spring 118 is mounted on stud 114 with one end thereof acting in an annular groove in stud 114 and the other end resting on the forward surface of plate 113. Spring 118 creates frictional drag between plate 113 and the surface of plate 27 which acts to retain plate 113 in whatever position it happens to be in relation to plate 27 and to provide resistance against pivoting motion of plate 113.

Shoulder 111 of lug 112 extends forwardly more than the corresponding shoulder of lug 109. Hence when finger 108 clears lug 109, shoulder 107 of finger 107 is still retained in contact with shoulder 111, thereby restraining blade 30 from clockwise rotation. However, the force exerted on blade 30 by spring 34 is sufficient to cause plate 113 to be rotated counterclockwise about stud 114 and against the frictional resistance imposed by spring 118.

The time required for plate 113 to rotate sufficiently for shoulder 107 to clear shoulder 111 constitutes a delay time for blade 30 and permits blade 29 to achieve its final clockwise position, or substantially that position, before blade 30 is released fully for clockwise rotation under action of spring 34. When blade 30 is so released, it rotates toward its FIG. 3 position and to its final clockwise position shown in FIG. 4. When blade 30 is momentarily in it FIG. 3 position, aperture 106 in blade 30 will be in alignment with apertures 105, 25' and 28, permitting an exposure to be made. As blade 30 continues on to its FIG. 4 position, aperture 106 will come out of alignment with apertures 105, 25' and 28 and blade 30 will mask these apertures, terminating the exposure.

As blade 30 rotates clockwise under action of spring 34 after being freed from shoulder 111, finger 108 dips down toward plate 27. However, the elevation of finger 108 above plate 107 and the angular velocity of finger 108 will be sufficient to cause finger 108 to contact, ride up and over a steeply inclined surface 119 of a forwardly extending lug 120 which is struck out of plate 27. Blade 30 is held substantially in its FIG. 3 position for a substantial time interval, e.g., 18–20 milliseconds, to permit an adequate exposure time. This delay time is occasioned by the time required for finger 108 to ride up and over surface 119. As finger 108 passes onto a less steeply inclined surface 121 of lug 120 it is pivoted toward plate 27 by spring 34 as blade 30 completes its clockwise rotation.

It will be observed that as dimple 110 passes under finger 108, the blades 29 and 30 will be separated by a positive mechanical action powered by the exposure making operation. Hence any gumminess of lubricant films or other tendency in the blades to stick when only the action of spring 34 continues the relative motion thereof is overcome.

The counterclockwise return rotation of blades 29 and 30 to their FIG. 1 positions occurs under action of spring 55, as described previously. As blade 30 rotates in a counterclockwise direction, finger 108 rides up inclined surface 121 of lug 120 and hence is elevated above plate 27 sufficiently to clear lug 109. Lug 112 will not be in the return path of finger 108 since plate 113 will remain in the FIG. 3 position thereof until a shoulder 122 of finger 108 contacts a forwardly extending surface 123 of plate 113, which contact acts to rotate plate 113 in a clockwise direction about stud 114 back to the FIG. 1 position of plate 113. An upwardly extending flange 124 at the forward end of surface 123 is provided at its upper end with a forwardly and upwardly inclined lip 125. The lip 125 and flange 124 act as guide surfaces which prevent blade 30 from pivoting forwardly too far on the return motion thereof.

The pivoting plate 113 can conveniently be used as a switch element to complete the operating circuit of a flash lamp (not shown). The flash attachment terminal plugs are shown in dotted lines at 126 and 127. The plug 127 is connected to a conductor strip 128 by a socket formation 129 provided at one end of strip 128. A conductive stud 130 projects forwardly from strip 128 and lies in the path of movement of a flange 131 provided at one edge of plate 113. Stud 130 passes through a hole 132 provided in plate 27. When plate 113 is pivoted to its FIG. 3 position, flange 131 contacts stud 130 completing a firing circuit for the flash lamp. This circuit is completed from plate 113 to plug 126 through plate 27 and a socket formation 133 in plate 27.

While the invention has been described in connection with a specific embodiment thereof and in a specific use, various modifications thereof will occur to those skilled in the art without departing from the spirit and scope of the invention as set forth in the appended claims.

What is claimed is:

1. In a roll film camera having a camera body, a shutter mechanism and a film winding mechanism, the combination comprising a supporting plate mounted in said camera, a shutter blade pivotally mounted on one side of said plate and forming a part of said shutter mechanism, manually operable means for pivoting said shutter blade from a rest position thereof to a far position thereof, means for returning said shutter blade from said far position to said rest position thereof upon release of said manually operable means, said shutter blade having a first opening therein and said plate having a second opening therein, said openings being in partial alignment when said shutter blade is in said rest position thereof, a lever arm pivotally mounted at the other side of said plate for pivotal motion in a front and back direction and in an up and down direction, a finger on said lever arm arranged to project into said second opening and adapted to enter said first opening to lock said shutter blade against pivoting motion out of said rest position thereof, means acting on said lever arm to urge said finger to pivot into said openings and to pivot into a portion of said second opening which is out of alignment with said first opening, said finger being positioned in the return path of said shutter blade, contact between said shutter blade and said finger as said shutter blade returns to said rest position thereof pivoting said lever arm to a position in which said finger enters said first opening, and means intercoupling said film winding mechanism and said lever arm and arranged to pivot said lever arm to withdraw said finger from said first opening when said film winding mechanism is operated thereby freeing said shutter blade for operation by said manually operable means.

2. In a roll film camera having a camera body, a shutter mechanism and a film winding mechanism, the combination comprising a supporting plate mounted in said camera, a shutter blade pivotally mounted on one side of said plate and forming a part of said shutter mechanism, manually operable means for pivoting said shutter blade from a rest position thereof to a far position thereof, first spring means for returning said shutter blade from said far position to said rest position thereof upon release of said manually operable means, said shutter blade having a notch in one edge thereof and said plate having a slot therein, said slot being in partial alignment with said notch when said shutter blade is in said rest position thereof, a lever arm pivotally mounted at the other side of said plate for pivotal motion in a front and back direction and in an up and down direction, a finger on said lever arm arranged to project into said slot and adapted to enter said notch to lock said shutter blade against pivoting motion out of said rest position thereof, second spring means acting on said lever arm to urge said finger to pivot forwardly into said slot and said notch and to pivot upwardly into a portion of said slot which is out of alignment with said notch, said finger being completely free of said shutter blade when the latter is in said far position thereof and being positioned in the return path of said edge of said shutter blade, contact between said edge of said shutter blade and said finger as said shutter blade returns to said rest position thereof pivoting said lever arm downwardly to a position in which said finger enters said notch under said forward pivoting action of said second spring means, and means intercoupling said film winding mechanism and said lever arm and arranged to pivot said lever to withdraw said finger from said notch when said film winding mechanism is operated thereby freeing said shutter blade for operation by said manually operable means.

3. In a roll film camera having a camera body, a shutter mechanism and a film winding mechanism, the combination comprising a supporting plate mounted in said camera, a shutter blade pivotally mounted on the front side of said plate and forming a part of said shutter mechanism, manually operable means for pivoting said shutter blade from a rest position thereof to a far position thereof, first spring means for returning said shutter blade from said far position to said rest position thereof upon release of said manually operable means, said shutter blade having a notch in one edge thereof and said plate having a slot therein, said slot being in partial alignment with said notch when said shutter blade is in said rest position thereof, a lever arm pivotally mounted at an intermediate point thereon at the rear of said plate for pivotal motion in a front and back direction and in an up and down direction about said intermediate point, a finger on said lever arm located at one side of said intermediate point and arranged to project into said slot and adapted to enter said notch to lock said shutter blade against pivoting motion out of said rest position thereof, second spring means acting on said lever arm to urge said finger to pivot forwardly into said slot and said notch and to pivot upwardly into a portion of said slot which is out of alignment with said notch, said finger being completely free of said shutter blade when the latter is in said far position thereof and being positioned in the return path of said edge of said shutter blade, contact between said edge of said shutter blade and said finger as said shutter blade returns to said rest position thereof pivoting said lever arm downwardly to a position in which said finger enters said notch under said forward pivoting action of said second spring means, and means intercoupling said film winding mechanism and said lever arm and arranged upon operation of said film winding mechanism to pivot said lever arm about said intermediate point to withdraw said finger from said notch, said second spring means pivoting said lever arm about said intermediate point and out of alignment with said notch when said finger is free of said notch thereby freeing said shutter blade for operation by said manually operable means.

4. In a roll film camera having a camera body, a shutter mechanism and a film winding mechanism, the combination comprising a supporting plate mounted in said camera, a shutter blade pivotally mounted on the front side of said plate and forming a part of said shutter mechanism, manually operable means for pivoting said shutter blade from a rest position thereof to a far position thereof, first spring means for returning said shutter blade from said far position to said rest position thereof upon release of said manually operable means, said shutter blade having a notch in one edge thereof and said plate having a slot therein, said slot being in partial alignment with said notch when said shutter blade is in said rest position thereof, a lever arm pivotally mounted at an intermediate point thereon at the rear of said plate for pivotal motion in a front and back direction and in an up and down direction about said intermediate point, a finger on said lever arm located at one side of said intermediate point and arranged to project into said slot and adapted to enter said notch to lock said shutter blade against pivoting motion out of said rest position thereof, second spring means acting on said lever arm to urge said finger to pivot forwardly into said slot and said notch and to pivot upwardly into a portion of said slot which is out of alignment with said notch, said finger being completely free of said shutter blade when the latter is in said far position thereof and being positioned in the return path of said edge of said shutter blade, contact between said edge of said shutter blade and said finger as said shutter blade returns to said rest position thereof pivoting said lever arm downwardly to a position in which said finger enters said notch under said forward pivoting action of said second spring means, a cam carried by said film winding mechanism, a slidable pin having one end thereof located in the path of said cam and having the other end thereof arranged to contact said lever arm at the other side of said intermediate point, said cam being operated upon operation of said film winding mechanism to cause said pin to pivot said lever arm about said intermediate point to withdraw said finger from said notch, said second spring means pivoting said lever arm about said intermediate point and out of alignment with said notch when said finger is free of said notch thereby freeing said shutter blade for operation by said manually operable means.

5. In a roll film camera having a camera body, a shutter mechanism and a film winding mechanism, the combination comprising a supporting plate mounted in said camera, an aperture blade and an exposure blade pivotally mounted about a common point on the front of said plate and each having a light admitting aperture arranged, in respective exposure positions of said blades, to be aligned with the path of light entering said camera, said exposure blade overlying said aperture blade and being in sliding contact therewith, said exposure blade being movable in a plane transverse to the plane of said aperture blade, means urging said exposure blade to pivot from a rest position thereof toward an exposure position thereof, a stop projecting from said plate in the path of said exposure blade and preventing said exposure blade from pivoting toward said exposure position thereof, a projection on said aperture blade positioned so as to contact said exposure blade only at an intermediate point in the pivoting path of said aperture blade, said projection riding under said exposure blade upon contact with the latter and moving said exposure blade in said transverse plane through an arc sufficient for said exposure blade to clear said stop, manually operable means for pivoting said aperture blade from a rest position thereof to said exposure position thereof, first spring means for returning said blades from said exposure positions to said rest positions thereof upon release of said manually operable means, said aperture blade having a notch in one edge thereof and said plate having a slot therein, said notch and said slot being in partial alignment with said notch when said aperture blade is in said rest position thereof, a lever arm pivotally mounted at an intermediate point thereon at the rear of said plate for pivotal motion in a front and back direction and in an up and down direction about said intermediate point, a finger on said lever arm located at one side of said intermediate point and arranged to project into said slot and adapted to enter said notch to lock said aperture blade against pivoting motion out of said rest position thereof, second spring means acting on said lever arm to urge said finger to pivot forwardly into said slot and said notch and to pivot upwardly into a portion of said slot which is out of alignment with said notch, said finger being completely free of said aperture blade when the latter is in said exposure position thereof and being positioned in the return path of said edge of said aperture blade, contact between said edge of said aperture blade and said finger as said aperture blade returns to said rest position thereof pivoting said lever arm downwardly to a position in which said finger enters said notch under said forward pivoting action of said second spring means, and means intercoupling said film winding mechanism and said lever arm and arranged to pivot said lever arm to withdraw said finger from said notch when said film winding mechanism is operated thereby freeing said shutter blade for operation by said manually operable means.

6. In a camera having a camera body, a lens and a shutter mechanism, the combination comprising an aperture blade and an exposure blade pivotally mounted in said camera and each having a light admitting aperture arranged, in respective exposure positions of said blades, to be aligned with the path of light entering said camera through said lens, said exposure blade overlying said aperture blade and being in sliding contact therewith, said exposure blade being movable in a plane transverse to the plane of said aperture blade, manually operable means for pivoting said aperture blade from a rest position to said exposure position thereof, means for returning said aperture blade from said exposure position to said rest position thereof, means urging said aperture blade to pivot from a rest position thereof through said exposure position thereof and to a final position thereof, means on one of said blades arranged to contact an edge of the other of said blades to force said exposure blade to return to said rest position thereof when said aperture blade is returned to said rest position thereof, a fixed stop mounted in said camera in the path of said exposure blade, contact between said stop and said exposure blade preventing pivoting of said exposure blade upon operation of said manually operable means, and a forwardly extending projection on said aperture blade, said projection being clear of said exposure blade when said blades are in said rest positions thereof and for a major portion of the pivoting motion of said aperture blade, said projection being arranged to contact said exposure blade at a point in the pivoting travel of said aperture blade prior to said exposure position of said aperture blade, said contact between said projection and said exposure blade causing said exposure blade to move away from said aperture blade in said transverse plane through an arc sufficient to cause said exposure blade to clear said stop thereby releasing said exposure blade for pivoting motion toward said exposure and final positions thereof.

7. In a camera having a camera body, a lens and a shutter mechanism, the combination comprising a supporting plate mounted in said camera and having a light admitting opening located in the path of light entering said camera through said lens, an aperture blade and an exposure blade pivotally mounted about a common point on the front of said plate and each having a light admitting aperture arranged, in respective exposure positions of said blades, to be aligned with said path of light, said exposure blade overlying said aperture blade and being in sliding contact therewith, said exposure blade being movable in a plane transverse to the plane of said aperture blade, manually operable means for pivoting said aperture blade from a rest position to said exposure position thereof, first spring means for returning said aperture blade from said exposure position to said rest position thereof, second spring means urging said aperture blade to pivot from a rest position thereof through said exposure position thereof and to a final position thereof, a lug on said aperture blade arranged to contact an edge of said exposure blade to force said exposure blade to return to said rest position thereof when said aperture blade is returned to said rest position thereof under action of said first spring means, a fixed stop mounted on said plate in the path of said exposure blade, contact between said stop and said exposure blade preventing said second spring means from pivoting said exposure blade upon operation of said manually operable means, and a forwardly extending projection on said aperture blade, said projection being clear of said exposure blade when said blades are in said rest positions thereof and for a major portion of the pivoting motion of said aperture blade, said projection being arranged to contact said exposure blade at a point in the pivoting travel of said aperture blade prior to said exposure position of said aperture blade, said contact between said projection and said finger causing said exposure blade to move away from said aperture blade in said transverse plane through an arc sufficient to cause said finger to clear said stop thereby releasing said exposure blade for pivoting motion toward said exposure and final positions thereof.

8. In a camera having a camera body, a lens and a shutter mechanism, the combination comprising a supporting plate mounted in said camera and having a light admitting opening located in the path of light entering said camera through said lens, an aperture blade and an exposure blade pivotally mounted about a common point on the front of said plate and each having a light admitting aperture arranged, in respective exposure positions of said blades, to be aligned with said path of light, said exposure blade overlying said aperture blade and being in sliding contact therewith, said exposure blade being movable in a plane transverse to the plane of said aperture blade, manually operable means for pivoting said aperture blade from a rest position to said exposure position thereof, first spring means for returning said aperture blade from said exposure position to said rest position thereof, second spring means acting on both of said blades and urging said aperture blade to pivot from a rest position thereof through said exposure position thereof and to a final position thereof, a lug on said aperture blade arranged to contact an edge of said exposure blade to force said exposure blade to return to said rest position thereof when said aperture blade is returned to said rest position thereof under action of said first spring means, a finger projecting from another edge of said exposure blade and being clear of said aperture blade, a triangular lug projecting from said plate in the path of said finger, contact between said triangular lug and said finger preventing said second spring means from pivoting said exposure blade upon operation of said manually operable means, a forwardly extending arcuate projection on said aperture blade, said projection being clear of said exposure blade when said blades are in said rest positions thereof and for a major portion of the pivoting motion of said aperture blade, said projection being arranged to contact and ride under said finger at a point in the pivoting travel of said aperture blade prior to said exposure position of said aperture blade, said contact between said projection and said finger causing said exposure blade to move away from said aperture blade in said transverse plane through an arc sufficient to cause said finger to clear said triangular lug thereby releasing said exposure blade for pivoting motion toward said exposure and final postions thereof, and timing means for delaying said release of said exposure blade.

References Cited by the Examiner

UNITED STATES PATENTS 2,493,195   1/1950   Henne _____ 95—60

JOHN M. HORAN, *Primary Examiner.*

NORTON ANSHER, *Examiner.*